United States Patent [19]

DiMaio et al.

[11] Patent Number: 5,356,254
[45] Date of Patent: Oct. 18, 1994

[54] HIGH TEMPERATURE SELF-LOCKING THREADED FASTENER

[75] Inventors: Anthony E. DiMaio, Barre, Vt.; Richard Duffy, Shelby Twp., Mich.; Mario Pollizzi, Rochester, Mich.; Eugene D. Sessa, Mt. Clemens, Mich.

[73] Assignee: Nylok Fastener Corporation, MaComb, Mich.

[21] Appl. No.: 918,070

[22] Filed: Jul. 24, 1992

[51] Int. Cl.⁵ ............................ F16B 39/00; F16B 39/34
[52] U.S. Cl. .................................... 411/302; 411/258; 411/903
[58] Field of Search .................... 411/258, 301–304, 411/411, 903, 908, 914

[56] References Cited

U.S. PATENT DOCUMENTS

| | | | |
|---|---|---|---|
| 3,498,352 | 3/1970 | Duffy | 411/302 |
| 3,568,746 | 3/1971 | Faroni | 411/302 |
| 3,731,724 | 5/1973 | Dorflinger | 411/302 |
| 3,746,068 | 7/1973 | Deckert et al. | 411/258 |
| 3,893,496 | 7/1975 | Wallace et al. | 411/258 |
| 4,081,012 | 3/1978 | Wallace | 411/258 |
| 4,282,913 | 8/1981 | Trimmer | 411/303 |
| 4,285,378 | 8/1981 | Wallace | 411/258 |
| 4,325,985 | 4/1982 | Wallace | 411/258 |
| 4,428,981 | 1/1984 | Wallace | 411/258 |
| 4,508,759 | 4/1985 | Wallace | 411/258 |
| 4,927,307 | 5/1990 | Fitzgerald et al. | 411/302 |
| 5,122,020 | 6/1992 | Bedi | 411/302 |

*Primary Examiner*—Neill R. Wilson
*Attorney, Agent, or Firm*—Niro, Scavone, Haller & niro

[57] ABSTRACT

This invention describes self-locking threaded fasteners having a patch or patches of fused high-temperature-resistant resin adhered to a portion of the threads, providing self-locking capabilities at temperatures above 400° F., well beyond the range of temperatures attainable using prior art patch materials such as nylon. A process for making such fasteners by spraying finely-divided high-temperature-resistant resin powder onto the threads of a fastener also is claimed.

34 Claims, 3 Drawing Sheets

HIGH TEMPERATURE SELF-LOCKING THREADED FASTENER

BACKGROUND OF THE INVENTION

1. Field of the Invention

This invention relates to an improvement in the manufacture of threaded fasteners that use thermoplastic patches to produce a self-locking effect. More particularly, the invention relates to the application, preferably by spraying, of high-temperature-resistant resin powders (specifically poly ($C_6$–$C_8$ alkyl isophthalamides)) to the threads of heated fasteners, resulting in fusion of the powders to form a locking patch. Such patches retain their self-locking ability at much higher temperatures than was previously possible. Optionally, an adhesive may be pre-applied to the fastener, or mixed with the high-temperature-resistant resin, to facilitate adherence of the resin to the fastener.

2. Description of the Prior Art

The manufacture of self-locking threaded fasteners that use a patch of thermoplastic resin on one side of the threaded fastener, applied by heating the threaded fastener and then spraying powdered resin onto the threads of the fastener, is known in the art and has enjoyed commercial success. U.S. Pat. No. Re. 28,812 (formerly U.S. Pat. No. 3,579,684), for example, describes a method of manufacturing self-locking threaded fasteners comprising the following steps:

1. Application by spraying of a thin, heat-softenable, substantially continuous film of liquid primer or tying material to a selected area of the exterior threads of a fastener such as a bolt.
2. Drying of the primer film.
3. Heating of the primed bolt by high frequency induction, to a temperature at which the bolt will retain sufficient sensible heat to soften and fuse powdered thermoplastic resin.
4. Entraining fine powdered thermoplastic resin, such as nylon 11, in a stream of air and spraying it directly onto one face of the threads of the heated bolt, forming an eccentric locking patch of resin covering part of the threads.

When a bolt prepared in this manner is threadably engaged with a nut, the thermoplastic material adhering to the sides of the thread flanks (the bearing surfaces) provides locking pressure which dramatically increases the torque required for disassembly, thus rendering the bolt self-locking. Patches of this sort can be formed on the internal threads of female fasteners, as taught in U.S. Pat. No. 3,894,509 (Duffy), as well as on the exterior threads of male fasteners.

The prior art describes various methods for enhancing the ease of assembly of such fasteners, such as by applying the resin so as to provide a thicker layer of thermoplastic on the flanks of the threads than on their crests, as in U.S. Pat. No. Re. 28,812. The prior art also discloses methods for increasing the retaining power of such fasteners when the male and female members are at the outside limits of dimensional tolerances by applying the resin so as to form a continuous ridge or bar of plastic above the thread crests, a result accomplished by reducing the application temperature slightly below that required to form a smooth, continuous coating of plastic, as in U.S. Pat. No. 3,787,222. And several different types of heating and spraying machines for applying the thermoplastic resin coatings to the exterior threads of male threaded fasteners have been patented, as in U.S. Pat. Nos. 3,452,714 and 3,530,827. Methods of applying such patches to the internal threads of female threaded fasteners also are known, as illustrated by U.S. Pat. No. 3,894,509.

The use of adhesives as one constituent of coatings for self-locking threaded fasteners also has been suggested. See, for example, U.S. Pat. Nos. 4,282,913 (Trimmer); 3,179,143 (Schultz); 4,632,944 (Thompson); and 4,927,307 (Fitzgerald). None of these references teaches or even suggests use of any adhesive to facilitate adherence of a high-temperature-resistant patch.

Finally, it has been suggested that light weight threaded fasteners can be fabricated entirely of certain thermoplastic resins containing high-modulus fibers for purposes of reinforcement. (See U.S. Pat. No. 4,863,330 to Olez). Among the resins suggested are TORLON ® and XYDAR ®. (Olez at Col. 5, lines 62–68). (TORLON ® is a polyamide/polyimide polymer mixture and XYDAR ® is an aromatic polyester polymer.) But Olez teaches that the bodies of the threaded fasteners themselves, and the threads, may be made from these thermoplastic resins reinforced with high-modulus fibers such as graphite. Olez teaches complex wrapped structures to enhance the strength of such fasteners. There is no suggestion that patches of these resins can be applied to threaded fasteners made of metal, or that once applied as patches to metal fasteners they will exhibit enhanced locking behavior at elevated temperatures. Indeed, Olez does not even suggest that the claimed fasteners fabricated of TORLON ® or XYDAR ® would be self-locking.

None of the prior art products and methods of manufacture for patch-type threaded fasteners solves the problem of retaining self-locking properties at elevated temperatures. Previous powdered patch material has included nylon 11 and similar thermoplastics which are applied to the threads of a fastener to obtain the desired self-locking capabilities. Such thermoplastics retain their self-locking properties only up to temperatures of 275° F. to 400° F. Above those temperatures, self-locking fasteners using conventional powdered thermoplastic resins lose their ability to lock and can no longer pass the test procedures required under qualifying specifications, such as Military Specification Mil-F-18240E, after exposure to elevated temperatures. (This Military Specification specifies a temperature requirement of 250° F., but its test procedures also are commonly used as a benchmark in evaluating the performance of locking fasteners that have been exposed to higher temperatures as well). Prior art users of thermoplastic patches have not been able to produce a patch that combines satisfactory adhesion to metal surfaces, particularly plated surfaces, with acceptable performance after exposure to elevated temperatures—that is, temperatures in excess of 400° F. For example, polyester patches made by the Long-Lok Fasteners Corporation of Cincinnati, Ohio and sold under the trade name "Poly-Lok" are advertised as maintaining effectiveness only up to 400° F. Other conventional plastic patches lose their self-locking ability when exposed to temperatures above about 275° F. to 300° F.

Prior art efforts to solve the problem of retention of self-locking properties at elevated temperatures have focused principally on mechanical approaches. U.S. Pat. No. 3,227,199, for example, discloses threaded fasteners in which a portion of the thread on a male threaded fastener differs in pitch from the remainder of the thread. Assembly of such a male threaded fastener with a female threaded fastener such as a nut creates a jamming action—that is, it retards disengagement of the female threaded fastener from the male threaded fastener by increasing the friction between the engagement surfaces of the two fasteners. As explained in that patent, other solutions to the problem have involved providing two sets of threads of the same pitch inside a single female threaded fastener, with the two sets of threads displaced axially from each other by a small distance in order to create a jamming action; or radially expanding a portion of the threads of a male fastener in order to engage the female fastener more tightly. But all of these solutions depend upon the manufacture of fasteners of non-standard dimensions, which are considerably more expensive and difficult to make than standard fasteners of uniform dimensions.

Accordingly, the object of this invention is to provide self-locking threaded fasteners of standard dimensions that rely on a thermoplastic patch to provide self-locking capability, and that can withstand appreciably higher temperatures than prior art patch-type fasteners while still maintaining the fastener's self-locking capabilities and meeting certain specifications outlining parameters for acceptable self-locking performance.

SUMMARY OF THE INVENTION

To achieve these objectives, a locking patch composed of high temperature resin is applied to a threaded fastener by spraying a fine powder of high temperature resin particles onto one or both sides or the entire circumference of a preheated threaded fastener. Optionally, the high temperature resin particles may be admixed with an adhesive before application, or an adhesive primer can be pre-applied to the fastener. Application can be accomplished by any one of the several spray processes and apparatus known to those skilled in the art, such as the methods and apparatus disclosed in U.S. Pat. Nos. 3,787,222 and Re. 28,812. We found that the result is a threaded fastener with a plastic locking patch that can withstand exposure to temperature of 400° F. or more for times in excess of one hour, while retaining its self-locking capabilities, compared to the 275° F. to 400° F. limitations advertised for the best prior art materials.

A variety of high temperature resin materials can be used to obtain the desired results of the present invention. We found that such resin materials include, but are not limited to, semicrystalline polyphthalamides formed from monomers such as hexamethyl isophthalamide; heptamethyl isophthalamide and octamethyl isophthalamide, and mixtures thereof. The foregoing resin materials have been found to produce satisfactory high-temperature-resistant patches without use of an adhesive. Commercially available resins in the foregoing group include AMODEL ®, which is available from Amoco Performance Products, Inc., Atlanta, Georgia.

The high temperature resin is applied as a fine powder, preferably having particles in which about 100% of the powder particles are in the size range of below 149 microns, and a majority by weight of particles are below 105 microns. Moreover, the powder particles are preferably sized so that no more than about 10% of the particles are below about 30 microns.

We have therefore developed specific improvements on prior art patch application methods suitable for use with high temperature resistant resin powders, which produce locking patches that adhere effectively to the fastener threads and exhibit satisfactory high temperature locking behavior. The improvements involve the use of a high-temperature-resistant resin with suitable adhesion properties. A suitable high-temperature-resistant adhesive also may be used. The adhesive may improve adhesion of the high temperature-resistant resin patch to the threads.

DETAILED DESCRIPTION OF THE INVENTION

1. General Description Of The Application Of Self-Locking Patches To Bolts According To This Invention A locking-type threaded element 9 made according to our invention is shown in FIG. 1 in the form of a bolt, but it will be understood that our invention can be used with other types of threaded fasteners, such as nuts, as well.

Figure 1:
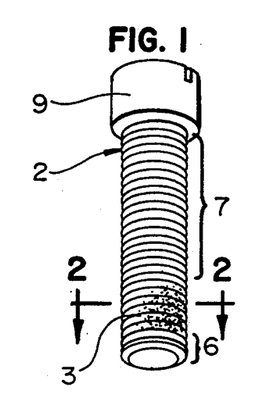
FIG. 1 shows a view of a male threaded fastener, to one side of which a single plastic locking patch made of high temperature resin has been applied according to the method of this invention.
Figure 2:
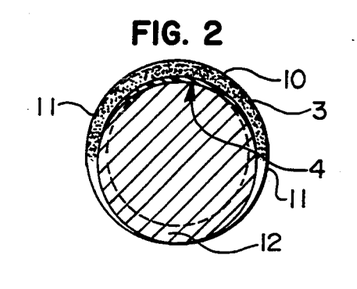
FIG. 2 is a cross-sectional view of the fastener along the line 2—2 of FIG. 1, showing the locking patch adhering to the threads of the fastener on one side of its shank.

FIGS. 1 and 2 show a bolt having a threaded shank 2 to which a patch 3 of high temperature resistant resin has been applied according to our invention. The thin coating of primer 4 is optional; in this preferred embodiment it is not necessary. In cross-section, FIG. 2, the patch 3 is generally thickest in its center 10 and thins progressively toward both edges 11, with the side of the bolt's shank 12 opposite the spray nozzle uncovered by the patch. It will be understood that methods known to those skilled in the art can be used to produce variations in the thickness of the patch 3 in the valleys, on the crests and on the helical bearing surfaces of the threads so as to improve locking power when the male and female threaded fasteners are near the outer limits of dimensional tolerances, as in U.S. Pat. Nos. 3,787,222 and 3,554,258, and that fasteners with high temperature resin patches of such varying conformations also are within the scope of this invention. (See FIGS. 3 and 4).

Figure 5:
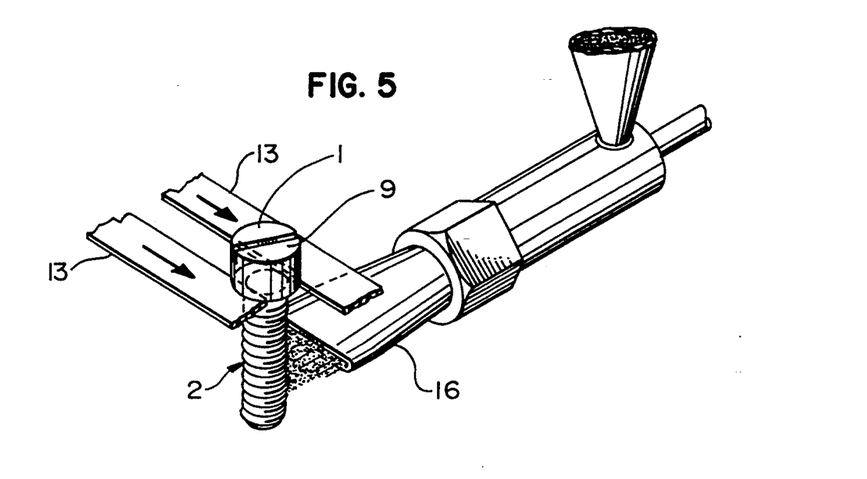
FIG. 5 illustrates a detail of one of the nozzles used to apply the high temperature resin.
Figures 6, 7:
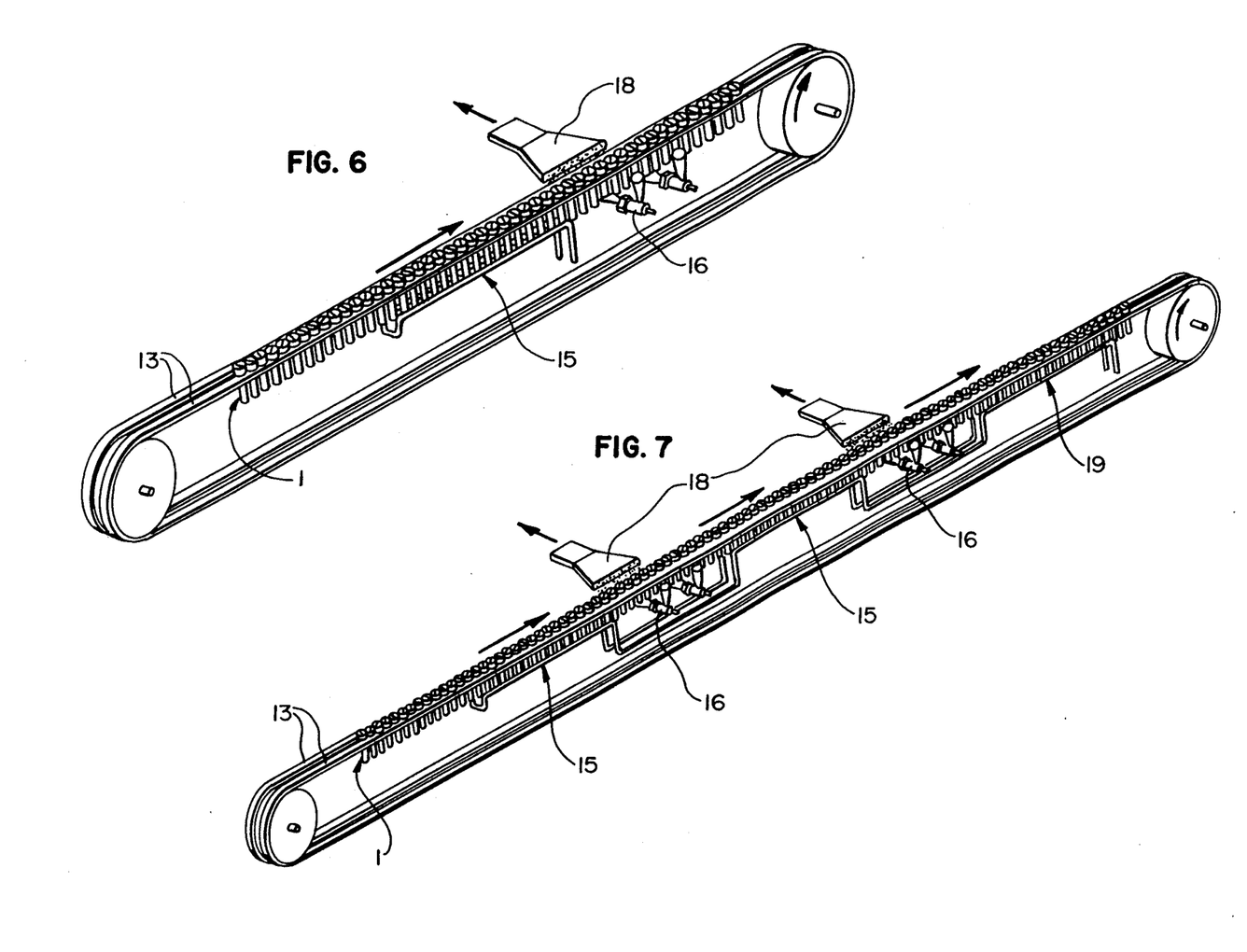
FIG. 6 illustrates one method of practicing the invention, in which only one group of nozzles is required to apply the high temperature resin powder.
FIG. 7 illustrates an alternate method of practicing the invention, utilizing two stages of high-temperature-resistant resin application followed by a reheat cycle.

One method of making the self-locking fasteners of this invention is illustrated in FIGS. 5 and 6. Referring to FIG. 6, a series of bolts 1 is positioned between and conveyed by two spaced parallel endless belts 13, with the bolt heads 9 supported by the belts 13 and the bolt shanks 2 hanging below the belts 13. The belts 13 carry the bolts 11 through a high frequency induction heating field created by heating coils 15, which are elongated in the direction of bolt travel and which provide a controlled heating time in order to raise the bolt shanks to the desired temperature for application of the high temperature resin powder. The heated bolts move out of the heating coils 15 and past a plurality of nozzles 16 (preferably two to four nozzles), through which high temperature resin powder is sprayed onto the bolt shanks 2. The nozzle is shown in FIG. 5.

It has been found that additional spraying and heating stations can be placed in series after the second heating station and high-temperature-resistant resin spraying station, as illustrated in FIG. 7. Such additional heating stations may include multiple spaced heating coils 15 separated by additional spraying stations which may include one or more additional nozzles 16. In addition, a post heating station 19 may also be utilized for purposes of finally setting and curing the high temperature resin powder. Such a post heating station 19 may include a heater such as an extension of heating coil 15 or similar heat source.

Moving past the second group of nozzles 16 (and the second heating station, if one is utilized), the bolts cool and are ejected from the belts 13 as finished products. FIG. 5 shows a detail of one of the nozzles 16 used to apply the high temperature resin powder.

Figure 3:
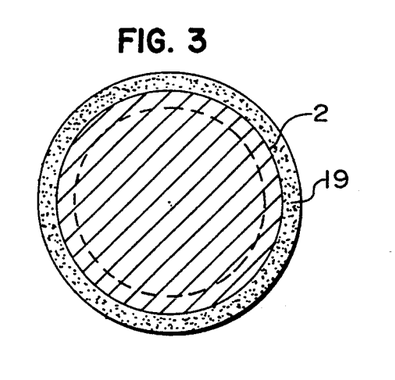
FIG. 3 shows another pattern of application of a high temperature resin, in which the locking patch completely surrounds the circumference of the threaded fastener.

By adjusting the orientation of nozzles 16, other configurations of locking patches can be produced. FIG. 3 shows a cross-section of the shank 2 of a threaded fastener of the type shown in FIG. 1 to which a uniform high-temperature locking patch 19 has been applied around the entire circumference of the shank.

Figure 4:
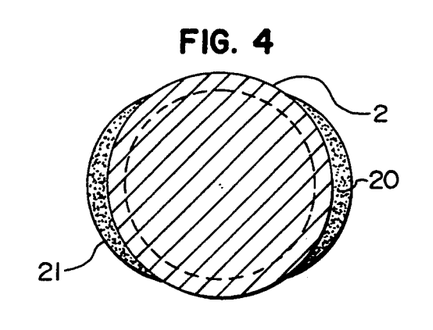
FIG. 4 illustrates yet another pattern of applying the high temperature resin, to form two discrete, circumferentially-opposed locking patches on opposite sides of the threaded fastener.

FIG. 4 illustrates a cross-section of the shank 2 of a threaded fastener of the type shown in FIG. 1 to which two locking patches 20 and 21 have been applied.

Suitable spraying arrangement for applying patches to the internal threads of female threaded fasteners also may be used.

Practice of our invention involves application of high temperature resistant patches in such a way as to conform to MIL Spec MIL-F-18240E, modified to provide the following test protocol:
(1) Assemble fastener
(2) Expose fastener to 450° F. temperature for three hours
(3) Cool fastener to room temperature
(4) Disengage and reassemble fastener fifteen times, recording torque required
(5) Heat reassembled fastener to 450° F. and hold at that temperature for one hour
(6) Disassemble fastener at 450° F.; measure torque required for that sixteenth disassembly.
Measured disassembly torques (also called "removal torque" values) should meet or exceed MIL-F-18240E standards for all removals, including the sixteenth at elevated temperature.

Alternatively, our invention may be practiced by applying high temperature resistant patches in such a way as to conform to the Industrial Fastener Institute's IFI-124 standards regarding test protocol, modified as follows:

(1) Seat fasteners to 160 inch-pounds in hardened (Rockwell 62) test blocks
(2) Expose to 450° F. temperature for one hour
(3) Disassemble fastener at 450° F.; measure torque required for disassembly. Measured disassembly torque values (also called "removal torque" values) should meet or exceed IFI-124 standards.

2. Specific Embodiments of This Invention

Two embodiments of the invention are described below. The first is the preferred embodiment in which no primer or separate adhesive is needed. In the second embodiment, phenyl-based polymer adhesive is mixed with the high temperature-resistant resin powder before application of the powder to the threaded fastener.

A. Preferred Embodiment Using Poly ($C_6$–$C_8$ alkyl isophthalamides)

In the preferred embodiment of our invention, the high temperature resin is a poly ($C_6$–$C_8$ alkyl isophthalamide) having a particle size distribution with 100% of the particles below 149 micrometers and, preferably, also with the majority (by weight) below 105 micrometers and with no more than 10% of the particles (by weight) below about 30 micrometers. The preferred structure of the high temperature-resistant resin is shown in FIG. 8.

Figure 8:
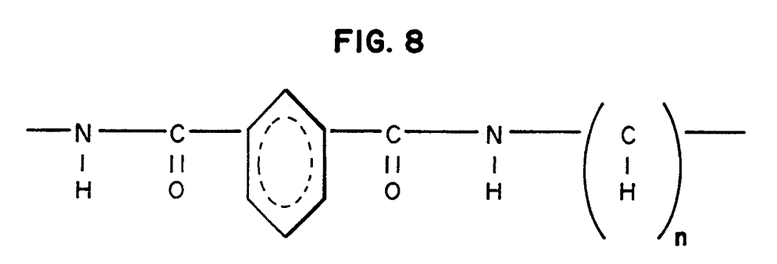
FIG. 8 shows the chemical structure of a preferred high-temperature-resistant resin.

In the compound shown in FIG. 8, n is between 6 and 8; the weight average molecular weight ($M_w$) is in the range of about 30,000 to 60,000 and the number average molecular weight ($M_n$) is about 8,000 to 12,000. Any combination or mixture of poly ($C_6$, $C_7$ and $C_8$ alkyl isophthalamides) may be used; poly ($C_6$, $C_7$ and $C_8$ alkyl isophthalamide) resins also can be used individually. High temperature-resistant resins suitable for practicing the embodiments described above include AMODEL ®, which is available from Amoco Performance Products, Inc., Atlanta, Georgia. Maximum temperature limitations for patches made of the resins disclosed have been found to exceed 400° F. based on tests made at 450° F.

For best results, the fasteners should be cleaned and degreased before application of the self-locking patches of this invention. In particular, care should be taken to ensure freedom from oil, grease, wax and heat-treating scale. If Cadmium or Zinc plating is desired, it should be applied after the application and fusion of the self-locking patches.

B. Second Embodiment Using Premixed High Temperature-Resistant Resin Powder Mixed With Adhesive In a second embodiment, an adhesive is first mixed with the high temperature-resistant resin particles.

Figure 9:
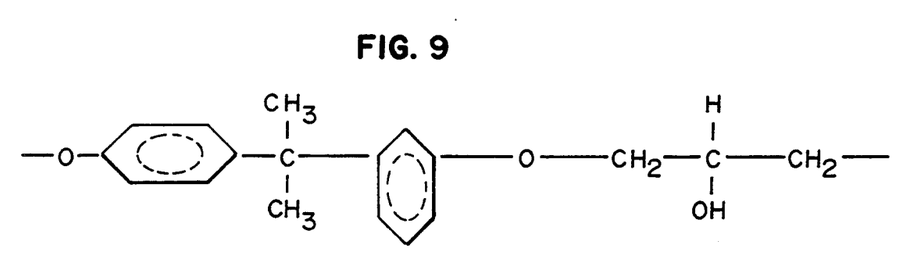
FIG. 9 shows the chemical structure of one powdered adhesive which may be used in one embodiment of this invention.

A suitable, optional powdered adhesive is poly (oxyl-1, 4-phenyleneisopropylidene-1, 4-phenyleneoxy-2-hydroxytrimethylene), having a weight average molecular weight ($M_w$) of about 60,000 to 65,000; a number average molecular weight of 25,000 to 30,000 and the structure shown in FIG. 9.

In addition, depending on the type of high temperature resin material and/or adhesive used, it may be desirable to include multiple heating and spraying stations such that the fasteners are first heated, then sprayed with high-temperature-resistant resin powder mixed with adhesive, then reheated and again sprayed with either high-temperature-resistant resin alone or high-temperature-resistant resin powder mixed with adhesive. One or more additional heating coils 15 and spray nozzles 16 can be utilized to accomplish such multiple heating and spraying operations. As described above, a post-heating operation may also be desirable.

EXAMPLES

The following examples illustrate the practice of the invention, but it is to be understood that the invention is not limited to the specific conditions described therein.

Without limiting the scope and content of the present invention, semicrystalline polyphthalamide (specifically, poly ($C_6$–$C_8$ alkyl isophthalamide)) will be used as an example of the high temperature-resistant resin to be applied to the threads of a threaded fastener.

Example 1—No Adhesive

Poly ($C_6$–$C_8$ alkyl isophthalamide) patches were applied to 5/16-18UNC-2A×2 inch unplated hex head cap screws according to the method of this invention. A particle size range of 90% below 130 microns and 10% below 30 microns was used for the high-temperature-resistant resin powder. The screws were heated to approximately 800° F. to 850° F. before the high-temperature-resistant resin powder was applied.

For comparison purposes, patches of the same configuration but made of conventional nylon were applied to the same size screws. Both the conventional screws (with ordinary nylon patches) and those made according to our invention (with poly ($C_6$–$C_8$ alkyl isophthalamide) patches) were seated at 160 inch-lbs in 5/16-18UNC-2B hardened steel (Rockwell 62) test blocks. The modified IFI-124 standards regarding test protocol described herein was then applied. The mean torques required to remove the screws at 450° F. after a one hour exposure to that temperature was then measured:

| Type of Patch | Torque, Inch-Lbs |
| --- | --- |
| Conventional Patch | 1.4 |
| Our Invention | 21 |
| IFI-124 Specification | 8 |

The screws made with a conventional patch failed to meet the 8 inch-lb minimum required by the IFI-124 specification, retaining no effective self-locking capability at all. The screws made with the patch of our invention, in contrast, easily satisfied that specification.

Example 2—No Adhesive

Comparison tests were made with 5/16-18UNC-2A×2 inch unplated hex head cap screws equipped with nylon patches (conventional technology) and with patches made of the poly $C_6$–$C_8$ alkyl isophthalamide) used in the preferred embodiment of this invention. The mating nuts were 5/16-18UNC-3B AQ steel test nuts. The procedures of MIL-F-18240E ¶ 4.5.2 through 4.5.4 were used, with the modifications detailed herein. The following results were obtained:

| | Removal Torque, In-lbs | |
| --- | --- | --- |
| | Conventional | Our Invention |
| Torque at 15th Removal (Removal at room temperature after 3 hrs. at 450° F.) | 10.3 | 17.4 |
| Torque at 16th Removal (Removal at 450° F. after one additional hour at 450° F.) | 0.15 | 16.0 |
| MIL-F-1840E Specification | 6.5 | 6.5 |

The patches made of poly ($C_6$–$C_8$ alkyl isophthalamides) according to our invention satisfied the standards both after a three hour heat soak and cooling to room temperature, and after an additional hour of exposure with removal of the nuts at elevated temperature. The conventional patches failed to meet the minimum removal torque requirements after the additional exposure.

Moreover, the torque required for the first removal of the screws with conventional patches after three hours at 450° F. was 106.5 in-lbs. The first removal torque for the conventional screws exceeded the maximum set by MIL-F-18240E; the screws made according to our invention, in contrast, satisfied that portion of the standard with a first removal torque of 46 in-lbs.

It will be appreciated by those skilled in the art that there are other methods of practicing the invention. For example, conventional liquid primers can be pre-applied to the threaded fasteners before application of the self-locking patches. Among such conventional liquid primers are oligomers of polyglycidyl ethers of bis phenol A (having one to three monomeric groups); resorcinol diglycidyl ether (RDGE), and commercially-available products such as DURALON EFI® thermosetting adhesive available from the Thermoclad Company of Erie, Pa. The foregoing examples are illustrative only, and are not intended to limit the scope of the claims in any manner.

We claim:

1. A threaded fastener having a self-locking patch, comprising:

a threaded portion adapted for engagement with a mating fastener, and a patch of fused high-temperature-resistant resin powder adhering to at least part of said threaded portion, said patch providing sufficient frictional engagement between said threaded fastener and said mating fastener to satisfy the minimum removal torque requirements set forth in MIL-F-18240E after exposure to a temperature in excess of 400° F. for a period of time in excess of three hours, wherein said high-temperature-resistant resin powder is selected from the group consisting of poly (hexamethyl isophthalamide), poly (heptamethyl isophthalamide), and poly (octamethyl isophthalamide), and mixtures thereof.

2. The threaded fastener of claim 1, wherein the weight average molecular weight ($M_w$) of said high-temperature-resistant resin powder is between about 30,000 and about 60,000.

3. The threaded fastener of claim 2, wherein the number average molecular weight ($M_w$) of said high-temperature-resistant resin powder is between about 8,000 to 12,000.

4. The threaded fastener of claim 1, wherein said high-temperature-resistant resin powder includes particles which are sized so that about 100% of the particles are below about 149 microns, and a majority by weight are below about 105 microns.

5. The threaded fastener of claim 1, wherein said high-temperature-resistant resin powder includes particles which are sized so that no more than about 10% of the particles by weight are below about 30 microns.

6. The threaded fastener of claim 1, wherein the weight average molecular weight ($M_w$) of said high-temperature-resistant resin powder is between about 30,000 and about 60,000; the number average molecular weight ($M_w$) of said high-temperature-resistant resin powder is between about 8,000 to 12,000 and said high-temperature-resistant resin powder includes particles which are sized so that about 100% of said particles are below about 149 microns, and the majority by weight are below about 105 microns, and no more than about 10% of said particles by weight are below about 30 microns.

7. A threaded fastener having a self-locking patch, comprising:
a threaded portion adapted for engagement with a mating fastener, and
a patch of fused high-temperature-resistant resin powder adhering to at least part of said threaded portion, said patch providing sufficient frictional engagement between said threaded fastener and said mating fastener to satisfy the minimum removal torque requirements set forth in IFI-124 after exposure to a temperature in excess of 400° F. for a period of time in excess of one hour, wherein said high-temperature-resistant resin powder is selected from the group consisting of poly (hexamethyl isophthalamide), poly (heptamethyl isophthalamide), and poly (octamethyl isophthalamide), and mixtures thereof.

8. The threaded fastener of claim 7, wherein the weight average molecular weight ($M_w$) of said high-temperature-resistant resin powder is between about 30,000 and about 60,000.

9. The threaded fastener of claim 8, wherein the number average molecular weight ($M_w$) of said high-temperature-resistant resin powder is between about 8,000 to 12,000.

10. The threaded fastener of claim 7, wherein said high-temperature-resistant resin powder includes particles which are sized so that about 100% of the particles are below about 149 microns, and a majority by weight are below about 105 microns.

11. The threaded fastener of claim 7, wherein said high-temperature-resistant resin powder includes particles which are sized so that no more than about 10% of the particles by weight are below about 30 microns.

12. The threaded fastener of claim 7, wherein the weight average molecular weight ($M_w$) of said high-temperature-resistant resin powder is between about 30,000 and about 60,000; the number average molecular weight ($M_w$) of said high-temperature-resistant resin powder is between about 8,000 to 12,000 and said high-temperature-resistant resin powder includes particles which are sized so that about 100% of said particles are below about 149 microns, and the majority by weight are below about 105 microns, and no more than about 10% of said particles by weight are below about 30 microns.

13. A threaded fastener having a self-locking patch, comprising:
a threaded portion adapted for engagement with a mating fastener, and
a patch of fused high-temperature-resistant resin powder mixed with an adhesive, adhering to at least part of said threaded portion, said patch providing sufficient frictional engagement between said threaded fastener and said mating fastener to satisfy the minimum removal torque requirements set forth in MIL-F-18240E after exposure to a temperature in excess of 400° F. for a period of time in excess of three hours, wherein said high-temperature-resistant resin powder is selected from the group consisting of poly (hexamethyl isophthalamide), poly (heptamethyl isophthalamide), and poly (octamethyl isophthalamide), and mixtures thereof.

14. The threaded fastener of claim 13, wherein said adhesive is poly (oxyl-1, 4-phenyleneisopropylidene-1, 4-phenyleneoxy-2-hydroxytrimethylene) and also has a number average molecular weight ($M_n$) between about 8,000 and 12,000.

15. The threaded fastener of claim 13, wherein said adhesive is poly (oxyl-1, 4-phenyleneisopropylidene-1, 4-phenyleneoxy-2-hydroxytrimethylene) and also has a number average molecular weight ($M_n$) between about 8,000 and 12,000.

16. A threaded fastener having a self-locking patch, comprising:
a threaded portion adapted for engagement with a mating fastener, and
a patch of fused high-temperature-resistant resin powder mixed with an adhesive, adhering to at least part of said threaded portion, said patch providing sufficient frictional engagement between said threaded fastener and said mating fastener to satisfy the minimum removal torque requirements set forth in IFI-124 after exposure to a temperature in excess of 400° F. for a period of time in excess of one hour, wherein said high-temperature-resistant resin powder is selected from the group consisting of poly (hexamethyl isophthalamide), poly (heptamethyl isophthalamide), and poly (octamethyl isophthalamide), and mixtures thereof.

17. The threaded fastener of claim 13, wherein said adhesive is poly (oxyl-1, 4-phenyleneisopropylidene-1, 4-phenyleneoxy-2-hydroxytrimethylene) and also has a number average molecular weight ($M_n$) between about 8,000 and 12,000.

18. The threaded fastener of claim 13, wherein said adhesive is poly (oxyl-1, 4-phenyleneisopropylidene-1, 4-phenyleneoxy-2-hydroxytrimethylene) and also has a number average molecular weight ($M_n$) between about 8,000 and 12,000.

19. A threaded fastener having a self-locking patch, comprising:
a threaded portion adapted for engagement with a mating threaded fastener, and
a patch of fused high-temperature-resistant resin powder adhering to at least part of said threaded portion, said patch providing sufficient frictional engagement between said threaded fastener and said mating threaded fastener to satisfy the minimum removal torque requirements set forth in MIL-F-18240E after exposure to a temperature in excess of 400° F. for a period of time in excess of three hours.

20. The threaded fastener of claim 19, wherein after exposure to said temperature for said time period, said patch provides sufficient frictional engagement to satisfy the minimum and maximum torque requirements set forth in MIL-F-18240E.

21. The threaded fastener of claim 19, wherein the said high-temperature-resistant resin powder includes particles which are sized so that about 100% of the particles are below about 149 microns, and a majority by weight are below about 105 microns.

22. The threaded fastener of claim 19, wherein said high-temperature-resistant resin powder includes particles which are sized so that no more than about 10% of the particles by weight are below about 30 microns.

23. A threaded fastener having a self-locking patch, comprising:
a threaded portion adapted for engagement with a mating fastener, and a patch of fused high-temperature-resistant resin powder adhering to at least part of said threaded portion, said patch providing sufficient frictional engagement between said threaded fastener and said mating fastener to satisfy the minimum removal torque requirements set forth in IFI-124 after exposure to a temperature in excess of 400° F. for a period of time in excess of one hour.

24. The threaded fastener of claim 23, wherein after exposure to said temperature for said time period, said patch provides sufficient frictional engagement to satisfy the minimum and maximum torque requirements set forth in IFI-124.

25. The threaded fastener of claim 24, wherein the said high-temperature-resistant resin powder includes particles which are sized so that about 100% of the particles are below about 149 microns, and a majority by weight are below about 105 microns.

26. The threaded fastener of claim 25, wherein said high-temperature-resistant resin powder includes particles which are sized so that no more than about 10% of the particles by weight are below about 30 microns.

27. A threaded fastener having a self-locking patch, comprising:
- a threaded portion adapted for engagement with a mating fastener, and
- a patch of fused high-temperature-resistant resin powder mixed with an adhesive, adhering to at least part of said threaded portion, said patch providing sufficient frictional engagement between said threaded fastener and said mating fastener to satisfy the minimum removal torque requirements set forth in MIL-F-18240E after exposure to a temperature in excess of 400° F. for a period of time in excess of three hours.

28. The threaded fastener of claim 27, wherein after exposure to said temperature for said time period, said patch provides sufficient frictional engagement to satisfy the minimum and maximum torque requirements set forth in MIL-F-18240E.

29. The threaded fastener of claim 27, wherein the said high-temperature-resistant resin powder includes particles which are sized so that about 100% of the particles are below about 149 microns, and a majority by weight are below about 105 microns.

30. The threaded fastener of claim 27, wherein said high-temperature-resistant resin powder includes particles which are sized so that no more than about 10% of the particles by weight are below about 30 microns.

31. A threaded fastener having a self-locking patch, comprising:
- a threaded portion adapted for engagement with a mating fastener, and
- a patch of fused high-temperature-resistant resin powder mixed with an adhesive, adhering to at least part of said threaded portion, said patch providing sufficient frictional engagement between said threaded fastener and said mating fastener to satisfy the minimum removal torque requirements set forth in IFI-124 after exposure to a temperature in excess of 400° F. for a period of time in excess of one hour.

32. The threaded fastener of claim 31, wherein after exposure to said temperature for said time period, said patch provides a sufficient frictional engagement to satisfy the minimum and maximum torque requirements set forth in IFI-124.

33. The threaded fastener of claim 31, wherein the said high-temperature-resistant resin powder includes particles which are sized so that about 100% of the particles are below about 149 microns, and a majority by weight are below about 105 microns.

34. The threaded fastener of claim 31, wherein said high-temperature-resistant resin powder includes particles which are sized so that no more than about 10% of the particles by weight are below about 30 microns.

* * * * *

REEXAMINATION CERTIFICATE (3076th)

United States Patent [19]
DiMaio et al.

[11] B1 5,356,254
[45] Certificate Issued Dec. 10, 1996

[54] HIGH TEMPERATURE SELF-LOCKING THREADED FASTENER

[75] Inventors: Anthony E. DiMaio, Barre, Vt.; Richard Duffy, Shelby Twp., Mich.; Mario Pollizzi, Rochester, Mich.; Eugene D. Sessa, Mt. Clemens, Mich.

[73] Assignee: Nylok Fastener Corporation, Rochester, Mich.

Reexamination Request:
No. 90/004,037, Dec. 6, 1995

Reexamination Certificate for:
Patent No.: 5,356,254
Issued: Oct. 18, 1994
Appl. No.: 918,070
Filed: Jul. 24, 1992

[51] Int. Cl.$^6$ ............................ F16B 39/00; F16B 39/34
[52] U.S. Cl. ............................ 411/302; 411/258; 411/903
[58] Field of Search .......................... 411/301–304, 258, 411/411, 424, 903, 908, 914

[56] References Cited

U.S. PATENT DOCUMENTS

| | | | |
|---|---|---|---|
| 3,498,352 | 3/1970 | Duffy | 411/302 |
| 3,568,746 | 3/1971 | Faroni | 411/302 |
| 3,731,724 | 5/1973 | Dorflinger | 411/302 |
| 3,746,068 | 7/1973 | Deckert et al. | 411/258 |
| 3,893,496 | 7/1975 | Wallace et al. | 411/258 |
| 3,896,760 | 7/1975 | Duffy | 118/308 |
| 4,081,012 | 3/1978 | Wallace | 411/258 |
| 4,282,913 | 8/1981 | Trimmer | 411/303 |
| 4,285,378 | 8/1981 | Wallace | 411/258 |
| 4,325,985 | 4/1982 | Wallace | 411/258 |
| 4,428,981 | 1/1984 | Wallace | 411/258 |
| 4,508,759 | 4/1985 | Wallace | 411/258 |
| 4,927,307 | 5/1990 | Fitzgerald et al. | 411/302 |
| 5,122,020 | 6/1992 | Bedi | 411/302 |

OTHER PUBLICATIONS

"New Fastener Locking Device" from Fastener Technology International, p. 24, Jun. 1991.
"Nylok Fastener Corporation Advertisement" from the Distributor's Link Magazine vol. 14, Spring, 1991.

*Primary Examiner*—Neill Wilson

[57] ABSTRACT

[This invention describes self-locking threaded fasteners having a patch or patches of fused high-temperature-resistant resin adhered to a portion of the threads, providing self-locking capabilities at temperatures above 400° F., well beyond the range of temperatures attainable using prior art patch materials such as nylon. A process for making such fasteners by spraying finely-divided high-temperature-resistant resin powder onto the threads of a fastener also is claimed] *Self-locking threaded fasteners having a patch of fused high-temperature-resistant resin powder adhering to at least part of the threaded portion of the fastener, the patch including polyphthalamide resin particles having specific particle size ranges and providing sufficient frictional engagement between the threaded fastener and a mating fastener so that removal torque values for the threaded fastener are predictable and substantially uniform. This special patch can withstand exposure to elevated temperatures (above 400° F.) while retaining its self-locking capabilities.*

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 18–25:

Accordingly, the object of this invention is to provide self-locking threaded fasteners of standard dimensions, *referred to here as "dimensionally-standard fasteners"*, that rely on a thermoplastic patch to provide self-locking capability, and that can withstand appreciably higher temperatures than prior art patch-type fasteners while still maintaining the fastener's self-locking capabilities and meeting certain specifications outlining parameters for accepable self-locking performance.

Column 5, lines 46–49:

Practice of our invention involves application of high temperature resistant patches in such a way as to conform to MIL Spec MIL-F-18240E, modified to provide the following test protocol *and referred to here as "the modified high-temperature MIL-F-18250E standards", thereby providing a controlled frictional engagement between the threaded fastener and a mating fastener*:

Column 5, line 64–column 6, line 7:

Alternatively, our invention may be practiced by applying high temperature resistant patches in such a way as to conform to the Industrial Fastener Institute's IFI-124 standards regarding test protocol, modified as follows, *with the modification being referred to here as "the modified high-temperature IFI-124 standards", thereby again providing a controlled frictional engagement between the threaded fastener and a mating fastener*:

Column 7, lines 6–10:

Without limiting the scope and content of the present invention, semicrystalline polyphthalamide (specifically, poly ($C_6$–$C_8$ alkyl isophthalamide)) will be used as an example of the high temperature-resistant resin to be applied to the threads of a threaded fastener. *The following examples illustrate the use of the high-temperature resistant polyphthalamide patch of the present invention. As indicated, the patch in these examples is not used with either an adhesive or a primer (whether mixed with the resin or pre-sprayed on the fastener), and this polyphthalamide, adhesive-free and primer-free patch is defined here as being "auto-adherent". Also, as required by the modified MIL-F-18240E and modified IFI-124 test protocols discussed below, it will of course be understood that the polyphthalamide patch of the present invention is "reusable" (i.e., the self-locking fastener having the high-temperature-resistant patch of the present invention can be reused while retaining its effective self-locking qualities and maintaining a controlled frictional engagement between the threaded fastener and a mating fastener)*.

AS A RESULT OF REEXAMINATION, IT HAS BEEN DETERMINED THAT:

Claims 1, 4–18, 21, 22 and 25–34 are cancelled.

Claims 2, 3, 19, 20, 23 and 24 are determined to be patentable as amended.

New claims 35–41 are added and determined to be patentable.

2. The threaded fastener of claim [1] *19*, wherein the weight average molecular weight ($M_w$) of said high-temperature-resistant resin powder is between about 30,000 and about 60,000.

3. The threaded fastener of claim [2] *19*, wherein the number average molecular weight ([$M_w$] *$M_n$*) of said high-temperature-resistant resin powder is between about 8,000 to 12,000.

19. A threaded fastener having a self-locking patch, comprising:

a threaded portion adapted for engagement with a mating threaded fastener, and a patch of fused high-temperature-resistant resin powder *comprising polyphthalamide resin particles* adhering to at least part of said threaded portion, *wherein the polyphthalamide particles are sized so that about 100% of the particles are below about 149 microns, a majority of the particles by weight are below about 105 microns, and no more than about 10% of the particles by weight are below about 30 microns*, said patch providing sufficient frictional engagement between said threaded fastener and said mating threaded fastener to satisfy the minimum removal torque requirements set forth in *the modified high-temperature* MIL-F-18240E *standards* after exposure to a temperature in excess of 400° F. for a period of time in excess of three hours.

20. The threaded fastener of claim 19, wherein after exposure to said temperature for said time period, said patch provides sufficient frictional engagement to satisfy the minimum and maximum torque requirements set forth in *the modified high-temperature* MIL-F-18240E *standards*.

23. A threaded fastener having a self-locking patch, comprising:

a threaded portion adapted for engagement with a mating fastener, and a patch of fused high-temperature-resistant resin powder *comprising polyphthalamide resin particles* adhering to at least part of said threaded portion, *wherein the polyphthalamide particles are sized so that about 100% of the particles are below about 149 microns, a majority of the particles by weight are below about 105 microns, and no more than about 10% of the particles by weight are below about 30 microns*, said patch providing sufficient frictional engagement between said threaded fastener and said mating fastener to satisfy the minimum removal torque requirements set forth in *the modified high temperature* IFI-124 *standards* after exposure to a temperature in excess of 400° F. for a period of time in excess of one hour.

24. The threaded fastener of claim 23, wherein after exposure to said temperature for said time period, said patch provides sufficient frictional engagement to satisfy the minimum and maximum torque requirements set forth in *the modified high-temperature* IFI-124 *standards*.

*35. The threaded fastener of claim 19, wherein said polyphthalamide patch is auto-adherent.*

*36. The threaded fastener of claim 19, wherein said polyphthalamide patch is reusable.*

*37. The threaded fastener of claim 19, wherein said polphthalamide patch is semicrystalline.*

*38. The threaded fastener of claim 19, wherein said fastener is heated to a temperature between about 800° F.*

*and 850° F. immediately before applying said high-temperature-resistant resin powder.*

*39. The threaded fastener of claim 19, wherein said fastener is a dimensionally-standard fastener.*

*40. The threaded fastener of claim 19, wherein said polyphthalamide patch is sprayable onto said fastener.*

*41. A dimensionally-standard threaded fastener having a self-locking patch, comprising:*

*a threaded portion adapted for engagement with a mating threaded fastener, and*

*a resuable and autoadherent patch of fused high-temperature-resistant resin powder comprising semicrystalline polyphthalamide resin particles adhering to at least part of said threaded portion, wherein the polyphthalamide particles are sized so that about 100% of the particles are below about 149 microns, a majority of the particles by weight are below about 105 microns, and no more than about 10% of the particles by weight are below about 30 microns, said patch providing sufficient frictional engagement between said threaded fastener and said mating threaded fastener to satisfy the minimum removal torque requirements set forth in the modified high-temperature MIL-F-18240E and IFI-124 standards after exposure to a temperature in excess of 400° F. for a period of time in excess of three hours.*

* * * * *